United States Patent
Singh et al.

(10) Patent No.: US 7,633,940 B1
(45) Date of Patent: Dec. 15, 2009

(54) LOAD-BALANCED ROUTING

(75) Inventors: Arjun Singh, Palo Alto, CA (US);
William J. Dally, Stanford, CA (US)

(73) Assignee: The Board of Trustees of the LeLand Stanford Junior University, Palo Alto, CA (US)

( * ) Notice: Subject to any disclaimer, the term of this patent is extended or adjusted under 35 U.S.C. 154(b) by 498 days.

(21) Appl. No.: 11/167,906

(22) Filed: Jun. 27, 2005

(51) Int. Cl.
*H04L 12/28* (2006.01)
*G01R 31/08* (2006.01)

(52) U.S. Cl. ............................... 370/389; 370/237
(58) Field of Classification Search ............... 370/389, 370/401
See application file for complete search history.

(56) References Cited

U.S. PATENT DOCUMENTS

| | | | |
|---|---|---|---|
| 5,862,138 A * | 1/1999 | Liu | 370/406 |
| 6,865,149 B1 * | 3/2005 | Kalman et al. | 370/225 |
| 7,215,639 B2 * | 5/2007 | De Maria et al. | 370/235 |
| 2004/0103218 A1 * | 5/2004 | Blumrich et al. | 709/249 |
| 2004/0246905 A1 * | 12/2004 | Dunagan et al. | 370/252 |
| 2005/0122955 A1 * | 6/2005 | Lin et al. | 370/351 |
| 2006/0253622 A1 * | 11/2006 | Wiemann et al. | 710/52 |

* cited by examiner

*Primary Examiner*—Derrick W Ferris
*Assistant Examiner*—Angel Brockman
(74) *Attorney, Agent, or Firm*—Crawford Maunu PLLC

(57) ABSTRACT

Network routing is effected for interconnection networks. According to an example embodiment of the present invention, an adaptive load-balanced routing approach is implemented for interconnection networks. Approximate global congestion is sensed as a function of congestion of channel queues, with routing approaches selected in accordance with the sensed congestion.

5 Claims, 13 Drawing Sheets

LOAD-BALANCED ROUTING

FEDERALLY SPONSORED RESEARCH OR DEVELOPMENT

This invention was supported in part by a subcontract under U.S. Government Prime Contract No. NBCH3039003; the U.S. Government has certain rights in the invention.

FIELD OF THE INVENTION

The present invention relates generally to data routing, and more particularly to routing approaches involving the selective use of routing paths.

BACKGROUND

A variety of approaches to the communication of data in network-type communications are implemented to suit various needs. Many networks are made up of a multitude of interconnected links, often connecting sub-networks within a larger network. Data can be routed across connected nodes in various points in the network in traveling from a data source to a data destination. Each leg of the path via which data travels from the source to destination is often referred to as a "hop," e.g., in the context of the number of links or nodes that data traverses. Where different networks are connected via routers, data can be passed from network to network by passing the data from one router to another, until the data reaches its destination (i.e., to a network node served by a router via which the data is sent). In such a router-based approach, each time data is accepted and routed by a particular router corresponding to a leg, or hop, in the data's journey to its destination. In general, connected networks of these or other types can be referred to as interconnection networks.

Interconnection networks are widely used today in a variety of applications such as those involving switch and router fabrics, processor-memory interconnect and I/O interconnect approaches. See, e.g., W. J. Daily, P. P. Carvey, and L. R. Dennison, *The Avici terabit switch/router*, Proc. of Hot Interconnects, pages 41-50, August 1998; S. L. Scott and G. M. Thorson, *The Cray T3E network: Adaptive routing in a high performance 3D torus*, Proc. of Hot Interconnects, pages 147-156, August 1996; and G. Pfister, *High Performance Mass Storage and Parallel I/O*, Chapter 42, pages 617-632, IEEE Press and Wiley Press, 2001. Three aspects of the design of an interconnection network include the topology, the routing algorithm used, and the flow control mechanism employed. The topology is generally chosen to exploit the characteristics of the available packaging technology to meet requirements such as bandwidth, latency and scalability of the application, at a minimum cost. Once the topology of the network is fixed, so are the bounds on its performance. For instance, the topology determines the maximum throughput (in bits/s) and zero-load latency (in hops) of the network. The routing and flow-control then strive to achieve these performance bounds.

Interconnection networks can be characterized as symmetric and asymmetric topologies. Symmetric topologies, in which each node has the same degree, have been popular in the interconnection networks community. All nodes in a symmetric topology can employ the same routing algorithm, irrespective of their orientation in the network. The symmetry of the network is also helpful for solving issues related to VLSI design. The function of a routing algorithm with symmetric topologies is generally to select a path to route a packet from its source, s, to its destination, d. Routing algorithms often make route selections in a manner that exploits locality to provide low latency and high throughput on benign traffic.

Many applications benefit from the provision of high throughput on adversarial traffic patterns for interconnection networks. In an Internet router, for example, there is no backpressure on input channels so the interconnection network used for the router fabric handles any traffic pattern, even the worst-case, at the line rate or packets will be dropped. To meet their specifications, I/O networks often provide guaranteed throughput on all traffic patterns between host and disk nodes. Some multi-computer applications are characterized by random permutation traffic, wherein each node sends all messages to a single, randomly-selected node. Random permutation traffic often arises when operating on an irregular graph structure or on a regular structure that is randomly mapped to the nodes of the machine. The throughput of the network on adversarial patterns can limit performance on these applications.

Routing algorithms are often implemented to strike a balance between the conflicting goals of providing low latency on local traffic and providing high throughput on adversarial traffic. To achieve high performance on local traffic, minimal routing algorithms that choose a shortest path for each packet are often favored. A minimal route is dynamically selected at each hop, based on the congestion of outgoing channels at that hop. Minimal algorithms, however, perform poorly on worst-case traffic due to load imbalance, and adversarial traffic patterns can load some links very heavily while leaving others idle.

Other routing approaches have involved random routing, such as those implemented with Valiant's algorithm (VAL), which is a fully randomized, two-phase routing algorithm. In the first phase, packets are routed from the source to a randomly chosen intermediate node using minimal routing. The second phase routes minimally from the intermediate node to the destination. In performing optimally in the worst case on symmetric networks, the VAL approach destroys locality, resulting in relatively poor performance on local traffic.

The above and other issues have presented challenges to routing approaches and, in particular, to routing in networks such as interconnection networks.

SUMMARY

The present invention is directed to overcoming the above-mentioned challenges and others related to the types of devices and applications discussed above and in other applications. These and other aspects of the present invention are exemplified in a number of illustrated implementations and applications, some of which are shown in the figures and characterized in the claims section that follows.

According to an example embodiment of the present invention, data is routed from a source to a destination on a network having a plurality of nodes. The nodes are coupled by communication channels, with each communication channel having a channel queue adapted for holding data to be transferred on the communication channel. A routing configuration is selected as a function of traffic congestion in the channel queues on the network.

According to another example embodiment of the present invention, data routing is facilitated using an adaptive routing approach. A plurality of nodes are connected via channels in an interconnection network, with each node having a router and a processor. Each router is adapted to estimate congestion in the network using congestion in the channel queues. When traffic on the interconnection network is benign, data is routed via a shortest, or minimal, route. When traffic is adversarial (i.e., wherein one or more channel queues become highly congested, relative to other channel queues), data is routed via an alternate, or non-minimal, route.

The above summary is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings in which.

Figure 1:
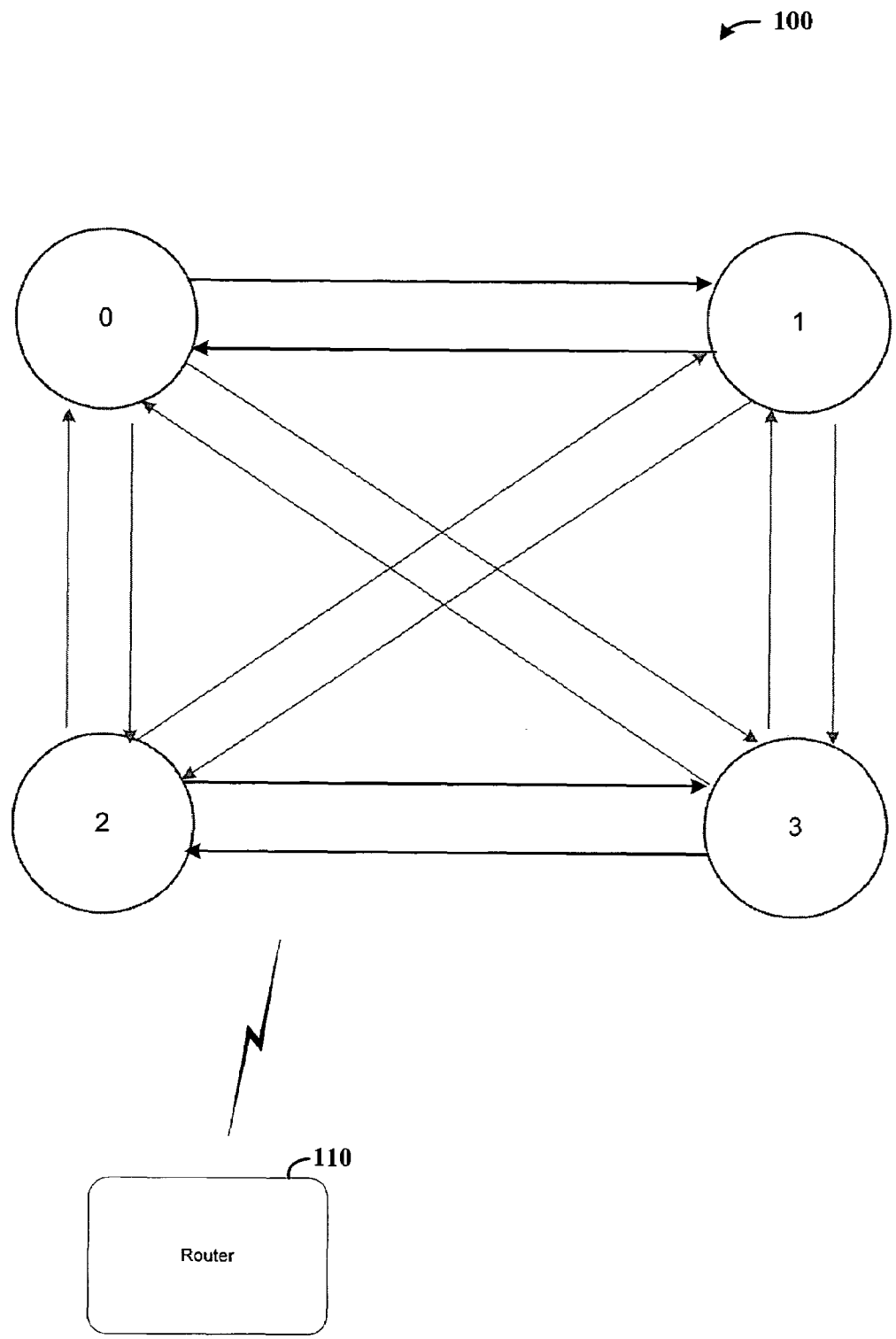
FIG. 1 shows an example network with which one or more example embodiments of the present invention are selectively implemented.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be applicable to a variety of different types of devices and approaches, and the invention has been found to be particularly suited for approaches to network data routing. While the present invention is not necessarily limited to such applications, various aspects of the invention may be appreciated through a discussion of various examples using this context.

According to an example embodiment of the present invention, an adaptive load-balanced routing approach is implemented for routing data (e.g., packets) between source and destination nodes in an interconnected network of channels. This approach is amenable to routing data in arbitrary symmetric interconnection networks. Data is selectively routed minimally (i.e., via a shortest route) or non-minimally (i.e., via a non-shortest route) as a function of a congestion condition of channel queues from which the data is routed. When traffic becomes congested as indicated by the congestion in channel queues (e.g., as defined by a threshold), a minimal routing approach is adaptively switched to a non-minimal routing approach. Further, as traffic becomes less congested, routing may also be adaptively switched back to a minimal routing approach.

In these approaches, routing data includes identifying a routing approach to use; in certain applications, routing data further includes implementing the identified routing approach. Further, these routing approaches are selectively carried out using a computer or other type of processing arrangement in nodes via which data is routed, programmed to implement routing and, where appropriate, use congestion information from the channel queues to provide an estimate of traffic congestion.

In connection with this and other example embodiments, routing data non-minimally generally involves using a longer than a shortest-route path, for example where queues in the shortest-route path are long enough such that routing via a longer path (e.g., with a shorter queue or queues) is faster. In some applications, this non-minimal routing approach involves selecting an intermediate node, randomly or otherwise, via which data is routed en route from a source to a destination, the intermediate node being along a path that is different than a shortest-route path between the source and destination. In other applications, this non-minimal routing approach involves routing data across completely different nodes, relative to those implemented for minimal routing. For instance, non-minimal routing with a tornado (k-ary n-cube) topography involves routing via different nodes, where minimal routing is in one direction and non-minimal routing is in an opposite direction on the topography.

Where an intermediate node is selected for routing, for some applications, the non-minimal route via an intermediate node is selected such that the sub-route between the source and the intermediate node is a minimal route, and the sub-route between the intermediate node and the destination is also a minimal route.

In some applications, congestion conditions indicative of benign and adversarial types of traffic conditions are used in a responsive nature to selectively, minimally and non-minimally route traffic. In general, benign traffic patterns are characterized by a naturally balanced load over all the channels of a particular network, such as when every node sends traffic uniformly and randomly to every other destination, with the load across all channels being balanced. When benign traffic patterns result in adequate data transfer (e.g., as predefined and/or exhibiting a condition of balance among channels), a minimal routing approach is implemented.

Adversarial traffic patterns generally exhibit spatial hot spots over a subset of channels in the network, i.e., they do not naturally balance load over all channels if minimal routing is used. Such adversarial traffic patterns may include, for example, those patterns involving a source node sending traffic to a distinct destination node. For such traffic, a non-minimal routing algorithm is implemented to balance load over channels of the network, e.g., where channel queue congestion is indicative of such hot spots.

In one implementation, a traffic congestion monitor is implemented to characterize traffic as benign or adversarial as discussed in the previous two paragraphs. The monitor identifies traffic as benign in response to generally balanced load across the channels in a particular network, and identifies traffic as adversarial in response to certain channels having significantly higher congestion (e.g., at least 10%, or at least 25% higher congestion), relative to other channels. The traffic congestion monitor may, for example, be implemented with a computer arrangement implemented with the source node and/or other nodes on a network of nodes via which the data is being transferred, and/or may be implemented in connection with a data routing controller that controls routing of the data.

Turning now to the figures, FIG. 1 shows an example network 100 with which one or more example embodiments of the present invention are selectively implemented. The network 100 is a four-node network, with the network's capacity given by 4b bits/s (e.g., a capacity throughput of uniform random traffic, which can be denoted as a traffic matrix in which every node sends data uniformly and at random to every destination). Routing on the network 100 is effected using a routing controller 110 and/or commensurate with routing approaches used in packet-based data networks, with the routing controller 110 selectively implementing minimal and adaptive types of routing approaches (e.g., by calling different programming functions, or algorithms) to facilitate routing of the data, and communicating as appropriate for network routing. While shown as a separate routing controller 110, the routing is effectively implemented, e.g., with control at each node in the network 100 (i.e., each node implements such a routing controller). Traffic on the network 100 is routed between nodes using the channels shown as arrows, in two directions, between each node and each of the other nodes. Queues in each channel are implemented, for example, using a data storage arrangement amenable to storing packets or other data to be routed along the channels.

In some applications, including selective applications implemented with FIG. 1, the throughput for a particular network generally refers to the maximum amount of data (maximum injection rate) that can be injected into each node such that no channel is saturated or is required to deliver more data than its bandwidth supports. With uniform random (UR) traffic, capacity throughput generally refers to an ideal throughput; for purposes of certain embodiments, both the throughput and the offered load are normalized to the capacity of the particular implemented network.

When traffic on the network 100 is benign (i.e., where traffic is uniform random (UR) traffic), a minimal routing traffic approach is implemented wherein every node sends traffic to every possible destination, uniformly and at random. In the context of routing packet data, each packet is routed minimally along a direct channel connecting its source to its destination (e.g., routing via a shortest link from all nodes yields the highest throughput).

When traffic on the network 100 is permutation traffic, queues along the direct channels tend to fill up when a minimal routing approach is implemented, leaving other queues empty. The imbalance in the (channel) queue occupancies is detected and used as an indication that the traffic pattern is adversarial for minimal routing. This imbalance is thus used to suggest that packets should be routed non-minimally (i.e., via a non-shortest-path route) to balance channel load. For example, routing via a non-minimal (longer) path with more hops, relative to a minimal (shortest-distance) path, while generally longer with benign traffic patterns, may be faster for adversarial traffic patterns when considering the queuing time associated with minimal paths. In this regard, the adversarial traffic is load-balanced by routing packets from a source s to a destination d via a non-minimal route, such as via a selected (e.g., randomly) intermediate node not in the minimal path.

In the above context and in connection with one or more example embodiments, balancing the channel load involves, e.g., balancing a channel load corresponding to the amount of data crossing a particular channel on average when routing in a traffic matrix at a particular injection rate and with a particular routing algorithm. In this context, the injection rate generally characterizes an average amount of data that is injected into each node of the network. The traffic matrix involves, e.g., a matrix of nodes (e.g., N×N), with the destination of traffic injected by each terminal node given by the matrix. Each entry ($\lambda_{ij}$) of the traffic matrix corresponds to the fraction of traffic injected from a terminal node i destined for a terminal node j, with the entries in each row adding to 1. A node is generally oversubscribed if the sum of its column entries in its traffic matrix is greater than 1, with the traffic matrix being admissible if none of the nodes is oversubscribed. Where the traffic matrix has a single 1 entry in each row and column, with all other entries being 0, the matrix is implemented as a permutation matrix wherein each source node sends traffic to a single distinct destination node. The routing algorithm generally maps a source-destination pair to a path through the network from the source to the destination. Minimal algorithms generally route all packets along some shortest path from source to destination, while non-minimal algorithms selectively route packets along longer paths.

One or more of a variety of approaches are implemented in making a decision as to whether to route minimally or non-minimally in the network 100. In one implementation, the following approach is used. At the source node of a packet, the queue length, $q_m$, is recorded for the outgoing channel along the shortest path from the source to the destination. A random intermediate destination is picked and the queue length, $q_{nm}$, is recorded along the shortest path from the source to the intermediate node. With the hop count (e.g., number of nodes) of the path between the source and destination denoted as $H_m$ and that of the path from the source to the intermediate node to the destination denoted as $H_{nm}$, the load along both minimal and non-minimal paths is balanced by minimally routing data if $$q_m H_m \leq q_{nm} H_{nm}, \quad \text{(Equation 1)}$$

suggesting benign traffic. If $$q_m H_m > q_{nm} H_{nm}, \quad \text{(Equation 2)}$$

suggesting adversarial traffic, the data is routed non-minimally along the non-minimal path from the source to the destination via an intermediate node. Other approaches to the detection of benign and adversarial traffic are selectively implemented in connection with these or other equations implementing channel queue congestion as an indication of benign or adversarial traffic, depending on the particular application; in these approaches.

In some applications, the above equations are implemented with a traffic monitor, e.g., as part of and/or in addition to a routing controller, implemented with nodes in the network 100. The traffic monitor accordingly characterizes traffic on the network as benign or adversarial, with the router respectively (and adaptively) implementing minimal or non-minimal routing.

Figure 1A:
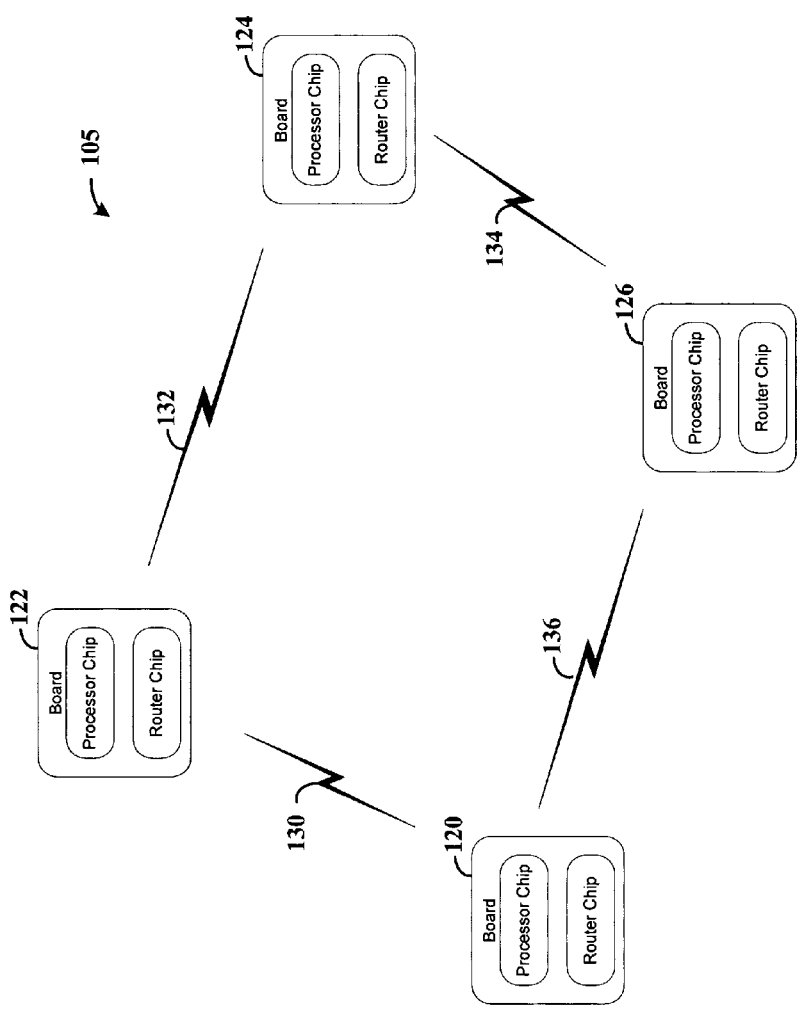
FIG. 1A is a supercomputer arrangement implemented with adaptive routing, according to another example embodiment of the present invention.

FIG. 1A shows a supercomputer arrangement 105 implementing an interconnection network adapted for routing data using congestion in channel queues to select a routing approach, according to another example embodiment of the present invention. The arrangement 105 includes four nodes 120-126, each node having a router and a processor respectively implemented in chips mounted to a board. Each combination of processor and router is implemented with each particular node, with the nodes connected via communication links 130-136, e.g., in a single cabinet and/or in distributed cabinets, with distributed cabinets connected via optical and/or other types of links. Each communication link has a channel queue associated with it, in which data queuing to be sent over the channel is stored. Each router provides routing configurations as a function of channel queue congestion between the nodes in a manner similar to that described in connection with FIG. 1 and/or otherwise above, with channel queue congestion conditions communicated to and/or estimated by the routers.

In one implementation, each router in FIG. 1A includes a congestion monitor that estimates a global traffic congestion condition as a function of congestion in the channel queues. Each router is adapted, for each packet of data, to direct the routing of the data packet between a source and a destination by providing a routing configuration that facilitates routing of the data traffic along a shortest path between the source and destination in response to the congestion monitor estimating a global traffic congestion condition predefined as benign. In addition, where the congestion monitor estimates a global traffic congestion condition predefined as adversarial, the router provides a routing configuration that facilitates routing of the data traffic via a path between the source and destination that is different from and longer than said shortest path.

Figure 2:
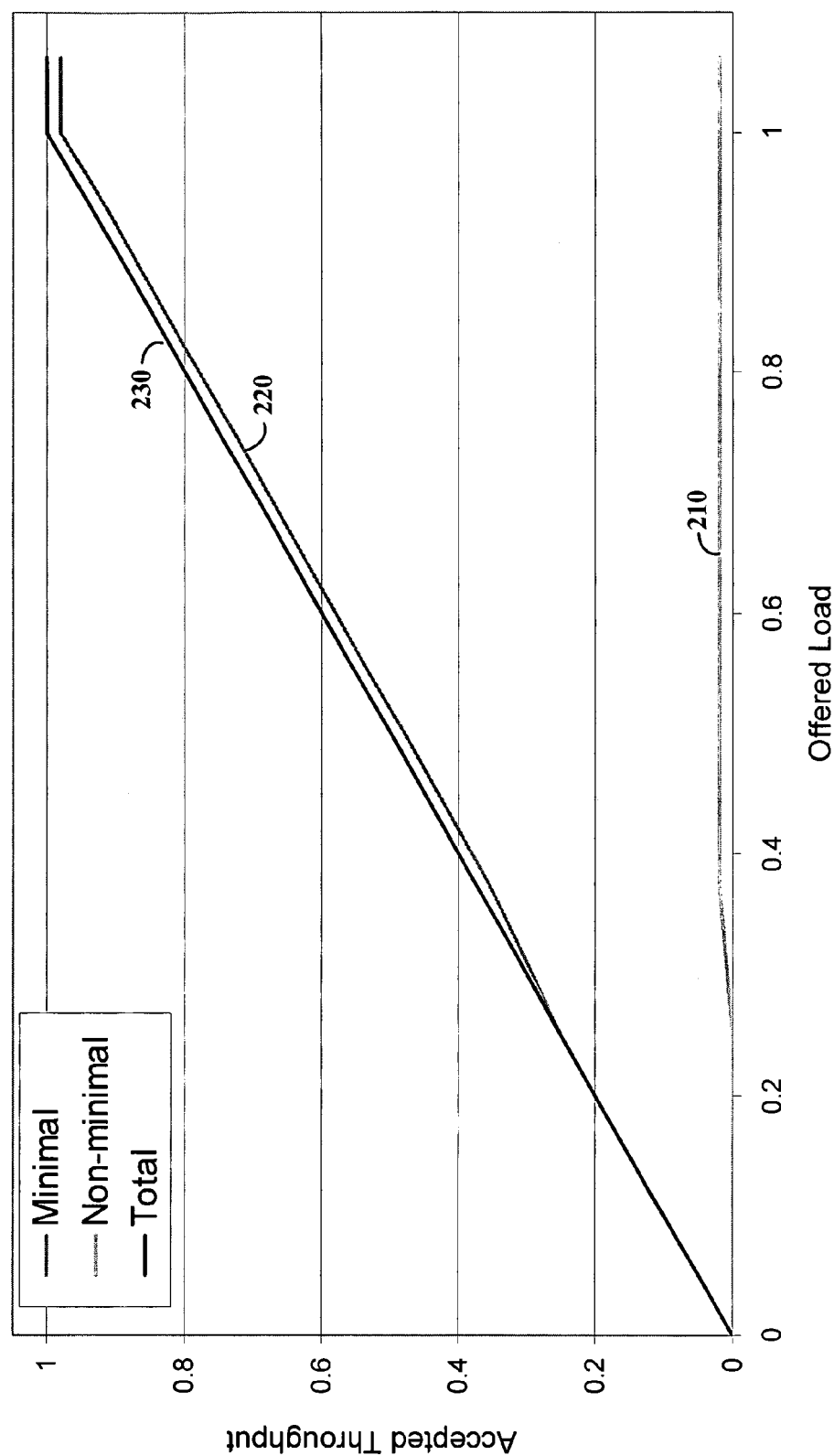
FIG. 2 shows an approach for routing data with uniform-random traffic, according to another example embodiment of the present invention.

FIG. 2 shows an approach for routing data with uniform-random (UR) traffic using the implementation discussed above with a four-node network such as that shown in FIG. 1. An accepted throughput is shown on the vertical axis, and an offered load is shown on the horizontal axis. The plotted traffic data is shown as non-minimally-routed traffic 210, minimally-routed traffic 220 and total traffic 230 (combining minimally and non-minimally-routed traffic). With UR traffic, data is routed minimally most of the time, with non-minimal routing adaptively implemented using Equations 1 and 2 above (wherein non-minimal routing is implemented when Equation 2 is true). Referring to FIG. 1, such minimal routing between, for example, nodes 0 and 1 involves routing data directly between the nodes, without routing via nodes 2 and/or 3.

Figure 3:
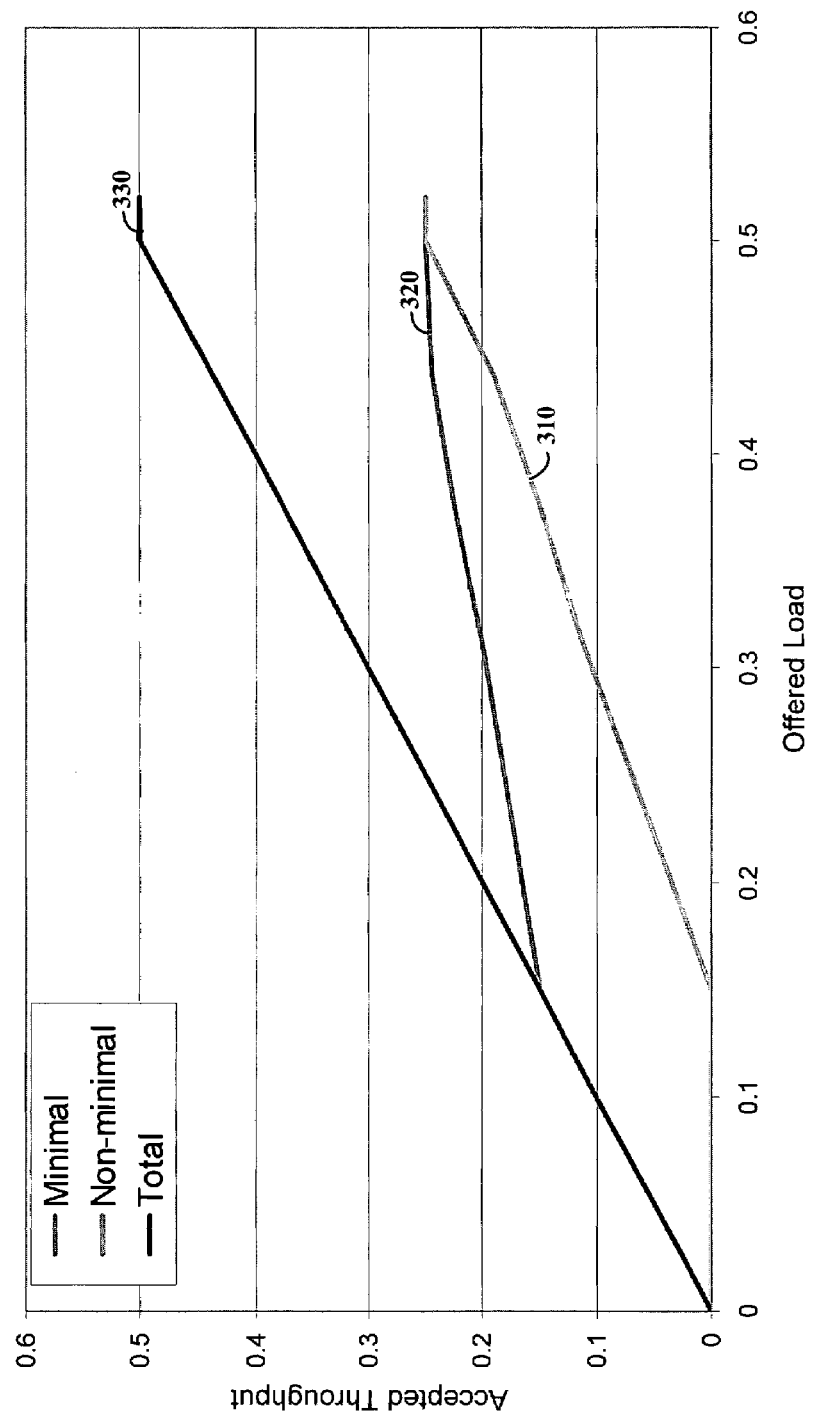
FIG. 3 shows an approach for routing data with permutation traffic, according to another example embodiment of the present invention.

FIG. 3 shows an approach for routing data with permutation traffic using the implementation discussed above with a four-node network such as that shown in FIG. 1. As with FIG. 2, an accepted throughput is shown on the vertical axis, and an offered load is shown on the horizontal axis. The plotted traffic data is shown as non-minimally-routed traffic 310, minimally-routed traffic 320 and total traffic 330 (combining minimally and non-minimally-routed traffic). With permutation traffic, data is routed minimally at very low loads, with non-minimal routing implemented at moderate to high loads. At a saturation point (e.g., where injection queues are saturated), half of the data is routed minimally with the other half of the data routed non-minimally (e.g., along two-hop non-minimal paths between a source node and a destination node, via an intermediate node, with direct paths from the intermediate node to both the source and destination nodes). For instance, referring to FIG. 1 as an example, a two-hop path implemented for non-minimal routing between node 0 and node 1 may involve routing data from node 0 to node 2, and subsequently from node 2 to node 1.

Figure 4:
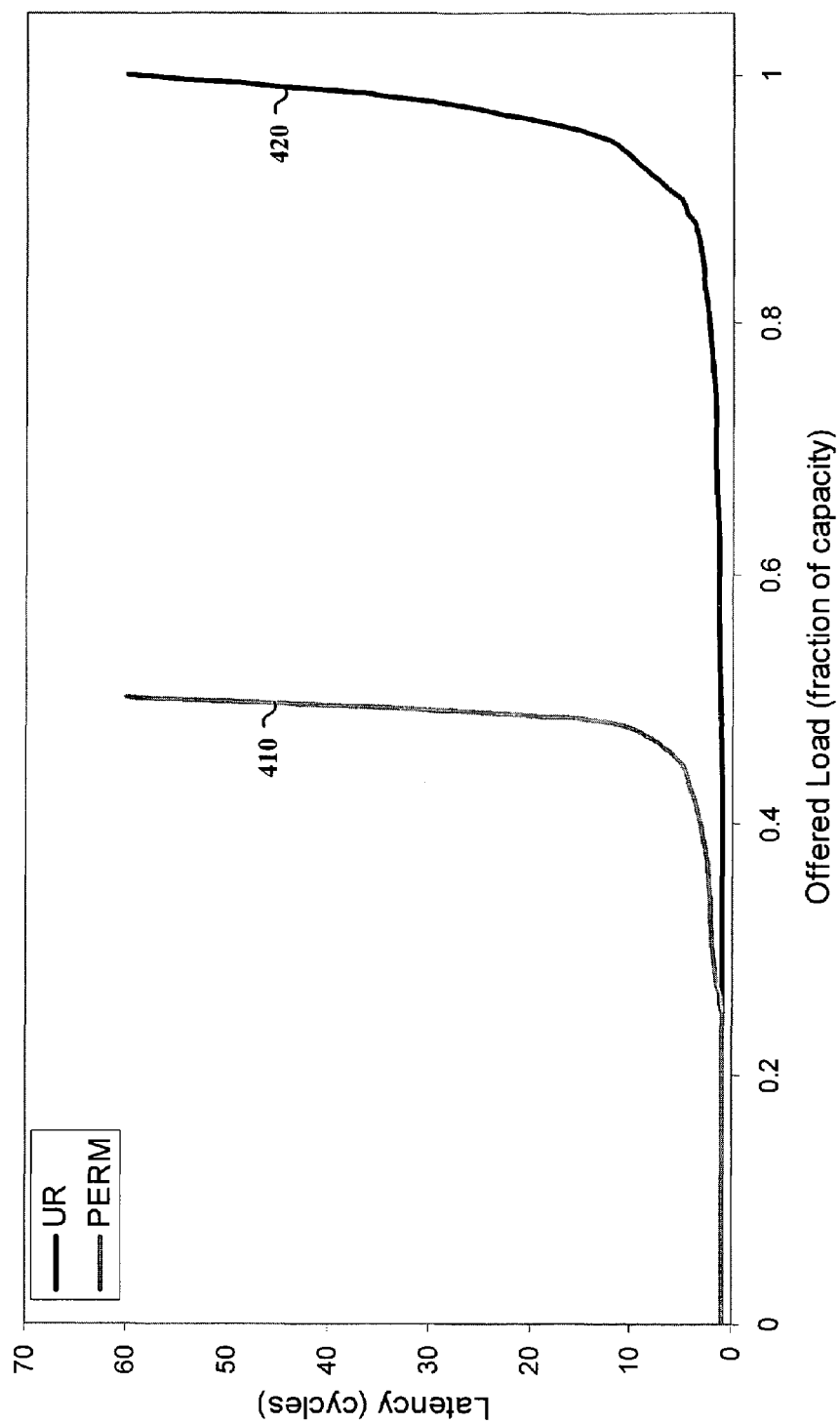
FIG. 4 shows a latency-load plot for a combined routing approach, according to another example embodiment of the present invention.

Referring to FIGS. 1-3 and implementing Equations 1 and 2 as discussed above, routing for UR traffic is selectively effected in a manner as shown in FIG. 2, with minimal routing being the dominant (most often) routing approach as commensurate with the satisfaction of Equation 1. Permutation traffic is selectively routed in a manner as shown in FIG. 3, with minimal routing implemented dominantly at low loads, with non-minimal routing increasingly implemented up to a saturation point (e.g., near an offered load of 0.5). With this approach, data is routed favorably on both UR and permutation traffic for a particular topology. FIG. 4 shows a latency-load plot for such a combined approach with both of these traffic patterns, with saturation at 50% of capacity (0.5 offered load) on permutation traffic (FIG. 3) and at 100% of capacity (1.0 offered load) on UR traffic (FIG. 2), respectively represented by plots 410 and 420.

In another example embodiment, an adaptive routing approach is implemented with arbitrary symmetric topologies. For instance, when a packet destined for a destination is received from a source queue at its source node, the packet is routed minimally or non-minimally as a function of congestion of the channel queues for the particular packet. Similar to the above examples with Equations 1 and 2, with $q_m$ denoted as the shortest output queue length among all shortest path channels, i.e., outgoing channels along shortest paths from the source to the destination. A random intermediate destination node is selected, with the shortest output queue length among all shortest path channels from the source to the intermediate destination node denoted as $q_{nm}$. As with the above example with FIG. 1, $q_m = q_{nm}$ if the intermediate node is the source node or the destination node. The hop count for the path between the source and the destination is $H_m$, and the hop count for the path from the source to the destination via the intermediate node being $H_{nm}$. The packet is routed minimally if Equation 1 is satisfied (e.g., true), and the packet is routed non-minimally otherwise (from the source to the destination via the intermediate node). In this regard, the non-minimal routing approach can be implemented in a manner similar to that discussed in connection with VAL above, with a worst-case throughput (e.g., over the space of all admissible traffic matrices) being half of capacity throughput.

The above-discussed approaches are applicable to a variety of topologies, with the examples shown in and discussed in connection with FIG. 1 being by way of example only, with the approach applicable to topologies such as 64-node symmetric topologies. The following example embodiments discuss such approaches with topologies including a fully connected graph approach, a 2-D (two-dimensional) torus approach and a 4-D (four-dimensional) cube connected cycle approach.

According to another example embodiment, a routing arrangement includes a routing topology having a fully connected graph of N nodes, the graph represented by $K_N$, with a channel connecting every source-destination pair. Each channel has a bandwidth of b bits/s. The bisection bandwidth (the sum of the bandwidth of the channels that cross a minimum bisection of the graph (a cut that partitions the entire graph nearly in half)) of $K_N$ is $B=N^2b/2$ bits/s. Therefore, the capacity of a N=64 node fully connected graph ($K_{64}$) is given by $2B/N = Nb = 64b$ bits/s.

An adaptive loading approach is implemented on $K_N$ using two virtual channels (VCs) per physical channel (PC) to avoid deadlock. A deadlock avoidance scheme is implemented and may involve approaches similar, e.g., to the structured buffer pool scheme described in E. Raubold and J. Haenle, *A method of deadlock-free resource allocation and flow control in packet networks*, in Proc. of the International Conference on Computer Communication, pages 483-487, Toronto, Canada, August 1976; and further in S. Toueg and J. D. Uilman, *Deadlock-free packet switching networks*, in Proc. of the ACM Symposium on the Theory of Computing, pages 89-98, Atlanta, Ga., United States, 1979, which are fully incorporated herein by reference. A packet that has traversed "h" hops may be buffered in any VC j, such that j<h. Since a packet can take at most 2 hops on $K_N$, the implementation of two VCs ensure that there is no cyclic dependency in the channel dependency graph (CDG) thereby avoiding deadlock.

Figure 5:
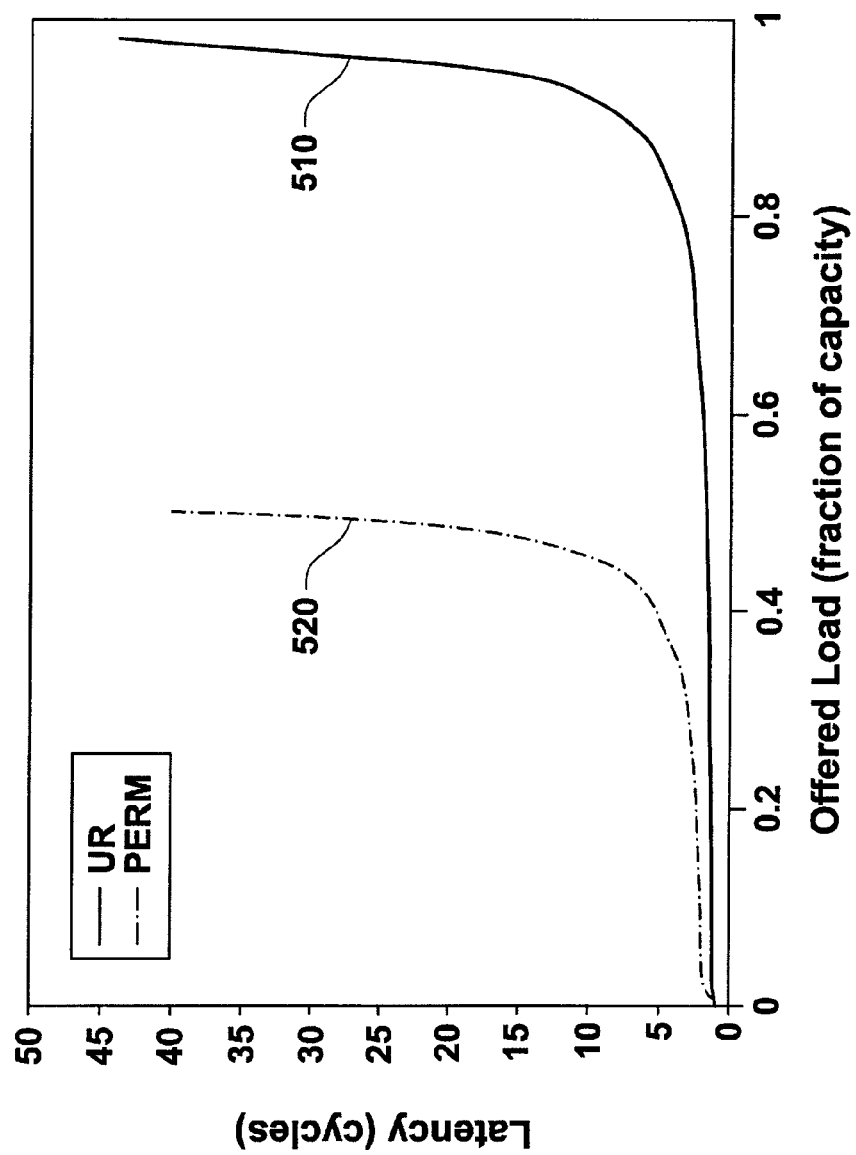
FIG. 5 shows an adaptive routing approach involving the use of routing schemes as a function of traffic congestion, according to another example embodiment of the present invention.

Continuing with the fully-connected graph $K_N$, FIG. 5 shows an adaptive routing approach involving the use of both minimal and non-minimal routing schemes as a function of traffic congestion on the graph. The vertical axis shows latency in cycles, and the horizontal axis offered load as a fraction of capacity. A minimal traffic routing approach is implemented as the best-case traffic pattern for this topology. An adversarial traffic pattern for $K_N$, is any permutation (PERM) traffic, i.e., every source node sends traffic to exactly one distinct destination node (except to itself). The fully connected nature of the graph facilitates identical performance on any permutation traffic.

With N=64, the graph is represented by $K_{64}$, with minimal routing implemented in response to channel queue congestion indicating benign traffic patterns, yielding a throughput of 64b bits/s (about 100% of capacity); the minimal routing instance is represented by plotted data 510. A non-minimal (e.g., VAL-type) approach is adaptively implemented in response to channel queue congestion indicating adverse traffic patterns, yielding a throughput of 32b bits/s (about 50% of capacity); this non-minimal routing instance is represented by plotted data 520. With this approach, data is routed at about 100% of capacity for benign traffic patterns, and at about 50% of capacity where adverse traffic patterns exist.

When minimal routing is carried out as with plotted data 510 and an unbalanced congestion condition is sensed, the routing approach is modified (e.g., a new algorithm is called) such that data is adaptively routed using a non-minimal approach as represented by plotted data 520. Where appropriate, changes in traffic congestion conditions can continually be monitored, with the routing approach adaptively switching back to the minimal approach where monitored congestion is indicative of benign traffic.

Figure 6:
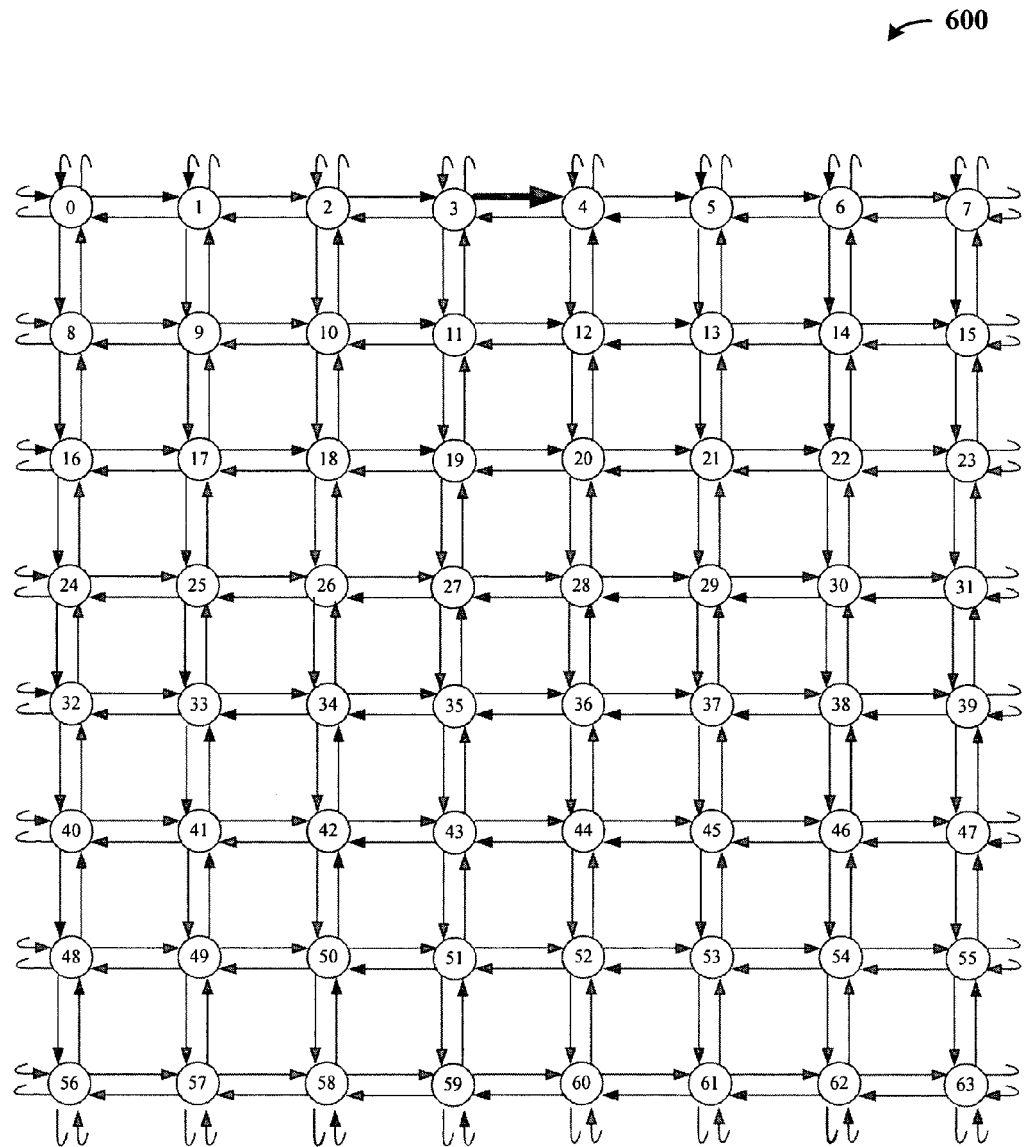
FIG. 6 shows a 2-D torus network configured and arranged for adaptive routing, according to another example embodiment of the present invention.

FIG. 6 shows a 2-D torus network 600 in an 8×8 (8-ary 2-cube) arrangement configured and arranged for adaptive routing, according to another example embodiment of the present invention. The torus network 600 accordingly has 64 nodes, labeled 0-63, via which data passes, with the passing of data via each node denotable as a hop, or leg, in the path of the data from source to destination. The bisection bandwidth of the network 600 is B=32b bits/s. Thus, its capacity is 2B/N=b bits/s. When benign (i.e., naturally balanced) traffic conditions prevail, a minimally-adaptive routing approach is implemented, e.g., by selecting, at the source, minimal directions along each dimension towards the destination for each packet of data. After the minimal directions are selected, each packet simply follows the minimal directions, adaptively choosing the next dimension to traverse at each hop. When adversarial traffic conditions prevail, packets are selectively routed via non-minimal directions; with the nature of the torus network 600 circular, such adversarial routing involve routing in a single non-minimal direction. With two dimensions available, more than one path is available in both the minimal and non-minimal direction (i.e., around the torus in the short, or long, direction). Routing, in this context, may be implemented by a routing controller implemented with each node in the network 600 and/or commensurate with routing approaches used in packet-based data networks.

Six virtual channels (VCs) are implemented per unidirectional physical channel (PC) with three VCs for each of the two possible phases of routing to facilitate deadlock freedom in the network 600. This approach may be implemented, for example, as an extension of the scheme proposed in L. Gravano, G. Pifarre, G. Pifarre, P. Berman, and J. Sanz, *Adaptive deadlock- and livelock-free routing with all minimal paths in torus networks*, IEEE Trans. on Parallel and Distributed Systems, 5(12): 1233-1252, December 1994.

For each phase of routing, there are two types of virtual channels per PC, referred to as "*" and "non-*" VCs. Packets move through the *-channels when traversing the most significant productive dimension. The non-* channels are fully adaptive and can be used at any time. In order to make the *-channel sub-network free from deadlock, two *-channels, $*_0$ and $*_1$, are implemented per PC. The channel $*_1$ is used if the packet has crossed a wrap-around edge in the current dimension, and the channel $*_0$ is used if the packet has not crossed the wrap-around edge. With this approach the channel dependency graph for the *-channels is acyclic, with *-channels inhibited from participation in a deadlock cycle. Hence, every packet that has not reached its destination always has a *-channel in the set of virtual channels it can possibly use to make forward progress to wards its destination. With fair assignment of VCs, deadlock is inhibited.

When benign traffic is present, traffic is routed minimally on the network 600, generally facilitating performance amenable to minimally adaptive approaches. When traffic on the network 600 is adversarial, the routing of the traffic is load balanced. In certain applications, adversarial traffic in the torus network 600 is routed using a channel queue routing approach with tornado (k-ary, n-cube) topography, such as that discussed further below.

Figure 7:
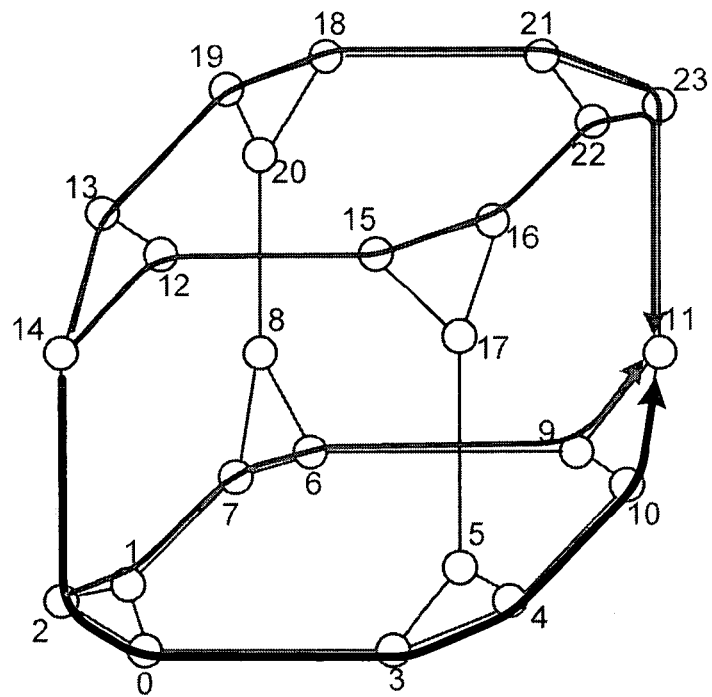
FIG. 7 shows a cube connected cycle arrangement, according to another example embodiment of the present invention.

FIG. 7 shows a cube connected cycle (CCC(3)) arrangement 700, according to another example embodiment of the present invention. In general, an n-dimensional CCC (CCC (n)) is a hypercube of "n" dimensions, with each node replaced by a ring of n nodes. Thus, for a CCC(n), there are a total of $N=n2^n$ nodes, each with a degree of 3. By way of example, two unidirectional links are combined into a single bidirectional link. The bisection bandwidth of CCC(n) is $B=2^n b$. Routing control is effected using a routing controller implemented with each node, with congestion in channel queues sensed to determine conditions of benign or adversarial traffic.

When benign traffic is present on the arrangement 700, minimal routing is selectively effected using one of two or more shortest paths from a source to destination. These paths may be identified, for example, using an approach such as that described by D. S. Meliksetian and C. Y. R. Chen in *Optimal routing algorithm and the diameter of the cube-connected cycles*, IEEE Trans. on Parallel and Distributed Systems, 4(10): 1172-1178, 1993, which is fully incorporated herein by reference.

For instance, when routing from node 14 to node 11 in FIG. 7, there are four possible shortest paths, each six hops long. At each hop, a packet is routed along a channel that takes it one hop closer to the destination. If there are two or more such outgoing channels, the router at the node routing the packet implements a minimally adaptive routing approach (in benign conditions) to route packets along the channel with the shortest queue length. In this regard, a packet in node 14 could be routed along channels from node 14 to either node 2, 12 or 13. When the length of the output queue for the channel from node 14 to node 2 is the shortest, the packet is routed to node 2. Once at node 2, the choices of channels are from node 2 to node 0 or 1. At this hop, if the length of the queue for the channel from node 2 to node 0 is shorter, the packet is routed to node 0. Once at node 0, the packet follows a direct path along nodes 3, 4, and 10 to reach its destination node 11. Other routing options are selectively implemented by the router at each node, for example when the packet is at node 14 or node 2, depending upon channel queue congestion conditions along alternate shortest path routes.

Figure 8:
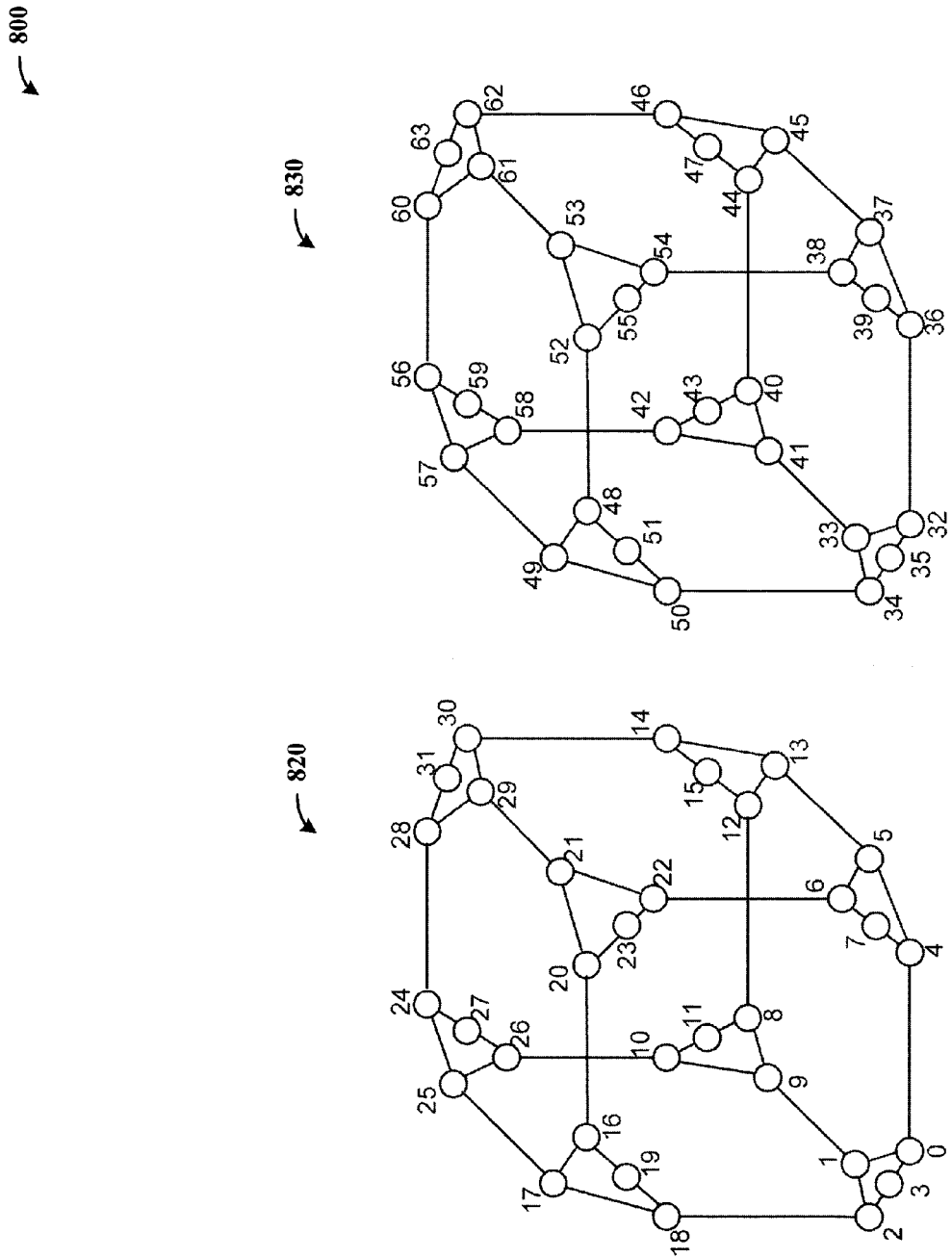
FIG. 8 shows a 64-node routing arrangement, according to another example embodiment of the present invention.

FIG. 8 shows a 64-node CCC(4) routing arrangement 800, according to another example embodiment of the present invention. The arrangement 800 is represented by two cubes 820 and 830, with a routing controller implemented with each node for routing packets along nodes in the cubes. For brevity, edges from cubes 820 to 830 are not shown, and edges in two directions are represented by a single bidirectional edge. The capacity of the arrangement 800 is given by $2B/N=2(2^n b)/n2^n=0.5b$ bits/s.

A structured buffer pool technique is implemented with the arrangement 800 to inhibit deadlock. With the maximum hop count for minimal routing approaches, VAL routing approaches and globally adaptive routing approaches on CCC(4) is 8, 16, and 16 respectively, eight VCs are implemented per PC for minimally routing (under benign conditions) and sixteen VCs are adaptively implemented for both VAL and globally adaptive routing (under adverse conditions). In some applications, channel queues are used to sense global congestion for each packet and the sensed congestion is used to drive a data or thread migration policy.

In another example embodiment involving a packet that can be delivered to any one of a set of destinations (e.g., the packet can be sent to any server that provides a particular service), the measure of global congestion is used to decide which server to select. For instance, in the context of the above discussion and the figures, the destination node may be implemented selectively among two or more nodes (e.g., referring to FIGS. 1, 6, 7 and 8). In this regard, a shortest-path route for benign traffic is identified as a function of the available destination nodes and the shortest paths therewith. Further, where adversarial traffic is present, congestion along available channels between the source and available destinations is compared, e.g., by a routing controller implemented at the node via which a packet is routed, with a destination selected to facilitate sending data via a relatively low-congestion routing path.

The following approach is selectively implemented for bounding worst-case throughput for minimal routing in connection with one or more example embodiments of the present invention. A directed edge, "e," of a graph G(V,E) is an NSP edge for the source-destination pair (s, d) via which a packet is to be routed, if all shortest paths from s to d include e. The edge e is an NSP edge when the shortest distance from s to d in G(V, E) is strictly less than the shortest distance from s to d in G(V,E\e).

An NSPE graph, $\hat{G}e$, is a bipartite graph for the edge "e" constructed from the graph G(V, E). It has two sets of vertices—the source set "S" and the destination set "D," with both S and D having cardinality |V|. For each pair (i, j), such that i∈S and j∈D, there is an edge from i to j in $\hat{G}e$, if e is an NSP edge from i to j in G(V, E). Intuitively, the NSPE graph attempts to construct an adversarial traffic pattern that exploits the fact that routes are restricted to minimal paths alone. If the minimal paths necessarily pass through an edge, e, even an adaptive (but minimal) algorithm cannot route around that edge.

The following example approach, with an implemented routing algorithm, describes the steps involved in finding an upper bound on the worst-case throughput for any minimal routing on graph G(V, E):

1. For all edges, e∈E,
   (a) $\hat{G}_e$—Construct NSPE Graph (G,e).
   (b) $M_e$—Find maximum matching ($\hat{G}_e$).
2. Return the matching with the biggest size. Return $M_{max}$, s.t. $|M_{max}|=\max_{e \in E}|M_e|$.

For every edge (channel), step 1(a) constructs an NSPE graph, $\hat{G}_e$, corresponding to e. Once $\hat{G}_e$ is constructed, step 1(b) constructs a maximum size matching, $M_e$, for $\hat{G}_e$. A maximum matching for the NSPE graph corresponds to a (possibly partial) traffic permutation where every source-destination pair sends all traffic across edge e. The process is repeated for every edge and the matching with the maximum size is returned in step 2. With the weight of this matching donated as |M|, and if every source node injects traffic at a rate c bits/s and the channel bandwidth is b bits/s, the maximum injection rate (throughput) is b/|M| bits/s. This is an upper bound on the worst-case throughput of the specific minimal (oblivious or adaptive) routing algorithm.

The run-time complexity of the above algorithm is characterized as $O(EV^2(V+E))$. For each edge, e, step 1(a) constructs the corresponding NSPE graph, $\hat{G}_e$. This approach involves checking for each source-destination pair in G, if e is an NSP edge. There are $|V|^2$ source-destination (s, d) pairs in G and checking if an edge is an NSP edge requires running a breadth-first-search (BFS) algorithm twice from s, which takes O(V+E) time. Hence, the total time required for step 1(a) is $O(V^2(V+E))$. Once $\hat{G}_e$ is constructed, step 1(b) constructs a maximum size matching, $M_e$, for $\hat{G}_e$, which takes $O(V^3)$ time. This process is repeated for every edge. Step 2 returns the matching with the maximum size, giving a total run time complexity of $O(EV^2(V+E))$. If the graph is symmetric, it is sufficient to consider just one edge in G, reducing the complexity to $O(V^2(V+E))$.

According to another example embodiment of the present invention, a channel queue routing approach involves routing data on tornado (k-ary, n-cube) networks by estimating congestion in channel queues and implementing network backpressure to transfer congestion information relating to these queues. This approach facilitates adaptively switching routing control from minimal routing to non-minimal routing on a relatively rapid switching cycle, using the channel queues while relying on the network's implicit backpressure to propagate information from further parts of the network.

Figure 9:
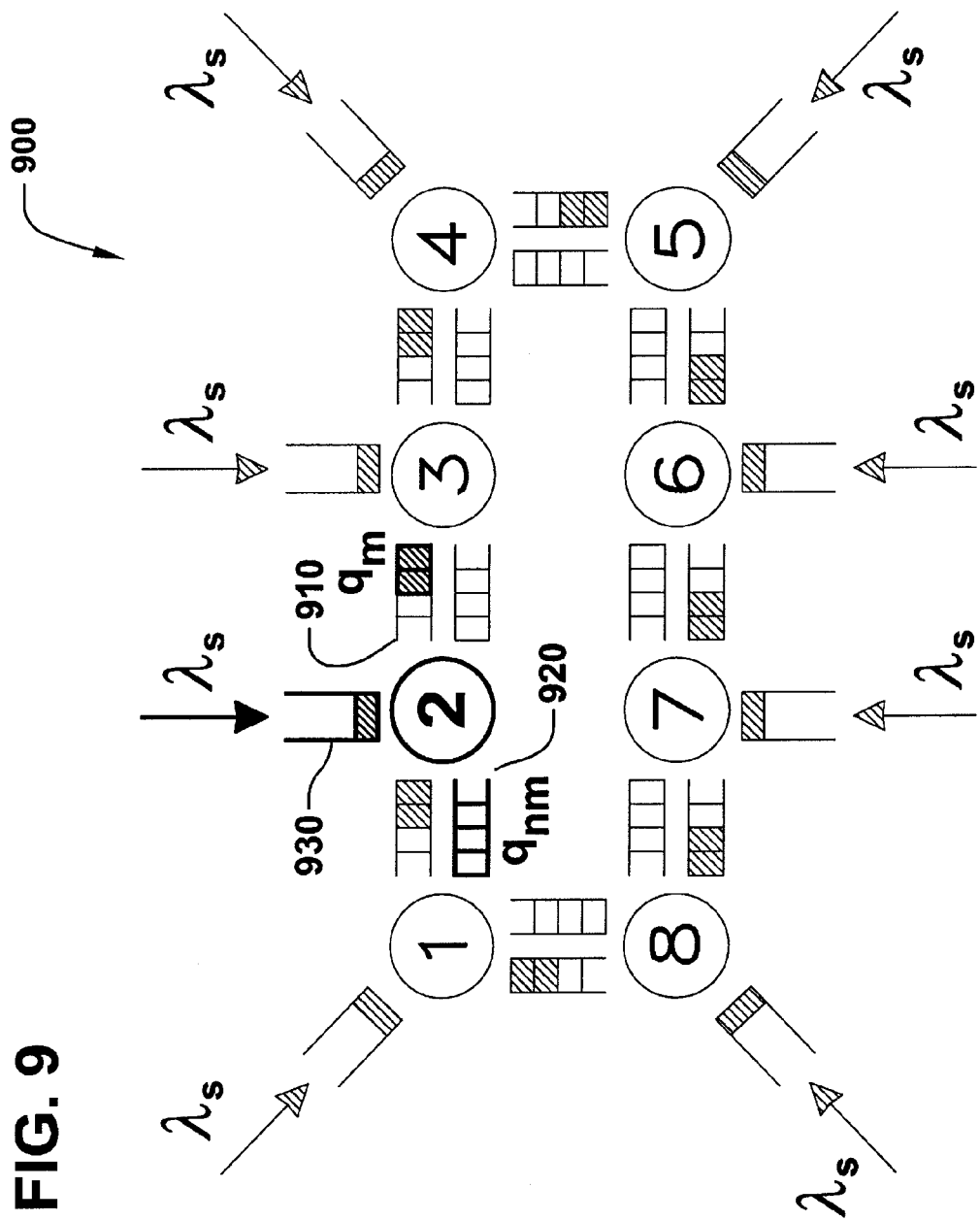
FIG. 9 shows tornado traffic routing on an 8-node ring using channel queue routing approach, according to another example embodiment of the present invention.

FIG. 9 shows tornado traffic routing on an 8-node ring 900 using a channel queue routing approach, according to another example embodiment of the present invention. The ring 900 includes nodes 1-8, with two routing paths on inner and outer routing paths. Referring to highlighted node 2, $q_m$ in channel 910 represents the occupancy of an outgoing queue in the clockwise direction on the outer path, and $q_{nm}$ in channel 920 represents the occupancy of an outgoing queue in the counterclockwise direction on the inner path. Node 2 is fed packets for routing in the context of a source node via injection queue 930. A routing controller function implemented, i.e., at each node, controls the routing of data and, continuing with the example of node 2, is implemented to calculate the average queue occupancy $\bar{q}=(q_m+q_{nm})/2$. Then, if $$q_m - \bar{q} < T,$$ (Equation 3)

where T is a set threshold value, the packet is routed minimally (i.e., the shortest distance in a first direction around the ring), and is otherwise sent along the non-minimal path (i.e., the other direction around the ring). The threshold value, T, is selected to meet certain conditions and/or topographies, depending upon the particular implementation. This switching approach, using congestion as indicated by Equation 3, facilitates switching between minimal and non-minimal routing in a relatively rapid manner. That is, the switch can be facilitated before all the minimal queues are filled as shown in FIG. 9 (e.g., with tornado traffic on the 8-node ring 900 shown at the point where it switches from minimal to non-minimal).

Figure 10:
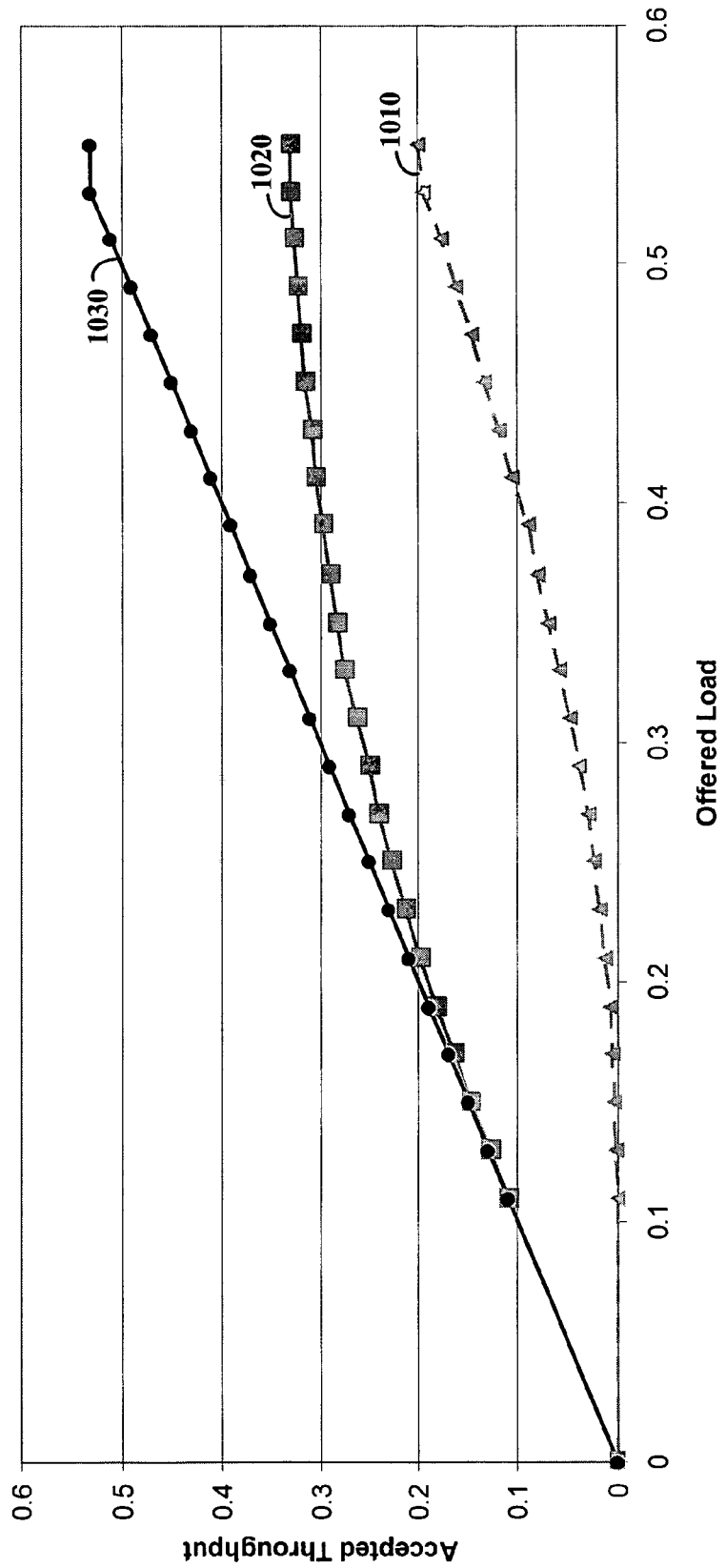
FIG. 10 is a plot of example data showing throughput on the vertical axis against offered load on the horizontal axis with a channel queue routing approach, in connection with another example embodiment of the present invention.

FIG. 10 is a plot of example data showing accepted throughput on the vertical axis against offered load on the horizontal axis with a channel queue routing approach, in connection with another example embodiment of the present invention. Plot 1010 represents non-minimally routed traffic, plot 1020 represents minimally-routed traffic and plot 1030 represents the total routed traffic, combined from plot 1010 and 1020. When Equation 3 is true for a particular node (e.g., node 2 in the 8-node ring 900), traffic is routed minimally. Correspondingly, when Equation 3 is false for a particular node, traffic is routed non-minimally. The plots in FIG. 10 demonstrate an implementation of this approach with selective minimal and non-minimal routing, using Equation 3.

In another example embodiment of the present invention, an adaptive routing approach as that described in connection with FIGS. 9 and 10 above is implemented with a multi-dimensional topology, where more than two routing paths are available for packets routed from a particular node. That is, for each dimension, there are two directions (e.g., positive and negative) in which data can be routed. For instance, referring to FIG. 9, another ring coupled to each node would add an additional path in each of the clockwise and counter-clockwise directions, providing another dimension via which the tornado traffic on the ring topology 900 can be routed. In this regard, for a 2 dimension network, there are 4 quadrants (++, +−, −+ and −−, using positive-negative terminology) for each source-destination pair (i.e., source and destination nodes).

Figure 11:
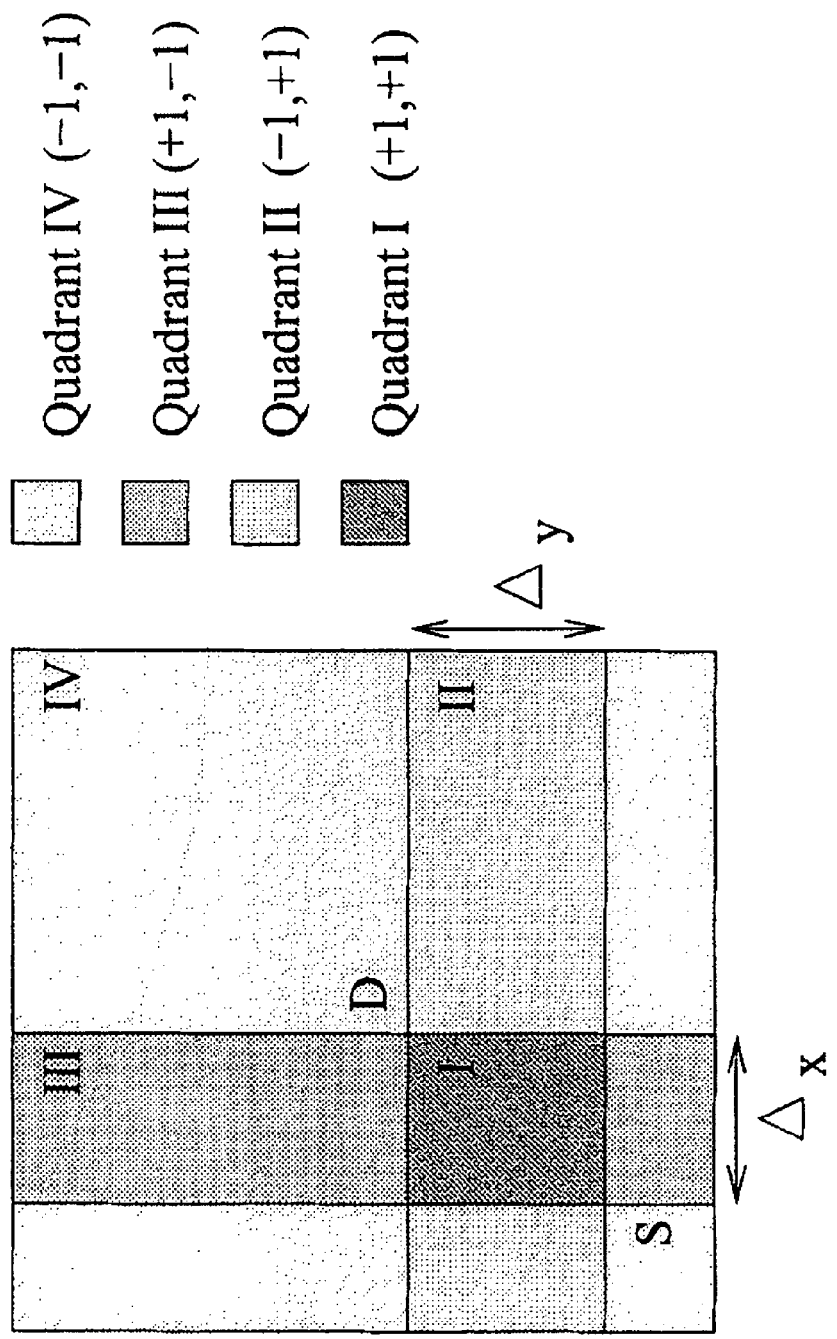
FIG. 11 shows one example application involving a multi-dimensional channel queue routing approach with 4 quadrants for a source-destination pair, according to another example embodiment of the present invention.

FIG. 11 shows one example application involving a multi-dimensional channel queue routing approach with 4 quadrants for a source-destination pair (0,0), (2, 3), according to another example embodiment of the present invention. Quadrant I is the minimal quadrant while the others are non-minimal quadrants. The quadrant in which to route is selected via computation of a minimal direction vector and an indication of congestion in a particular selected quadrant which is then used to determine whether to route data in the quadrant minimally or non-minimally. This approach can be implemented with a multitude of source-destination pairs with k-ary n-cube (torus) topologies. The following describes one such approach involving the selection of a quadrant in which to route in a k-ary n-cube.

Suppose the source node is $s=\{s_1, s_2, \ldots, s_n\}$ and the destination node is $d=\{d_1, d_2, \ldots, d_n\}$ where $x_i$ is the coordinate of node x in dimension i. A minimal direction vector $r=\{r_1, r_2, \ldots, r_n\}$ is computed, where for each dimension i, $r_i$ is chosen to be +1 if the short direction is clockwise (increasing node index) and −1 if the short direction is counterclockwise (decreasing node index). A quadrant to route in is selected by choosing a quadrant vector q where for each dimension i, $q_i=r_i$ is selected to route minimally and $q_i=-r_i$ is selected to route non-minimally. Each node's outgoing channel queue occupancies along both directions (+ and −) in each dimension are recorded (e.g., with a routing controller implemented in the node), to approximate quadrant congestion information.

The congestion, $Q_j$ for quadrant j is approximated by the sum of the outgoing queues in the corresponding directions in each dimension given by q. Next the average quadrant congestion is computed as $$\overline{Q} = \frac{\sum_{j=1}^{2^n} Q_j}{2^n}.$$ (Equation 4)

The quadrant m with the smallest distance from s to d whose congestion satisfies the inequality $$Q_m - \overline{Q} < T$$ (Equation 5)

(where T is a threshold value) is selected.

Once the quadrant is selected, the packet is routed adaptively within that quadrant. A dimension i is productive if, the coordinate of the current node $x_i$ differs from $d_i$. In other words, it is productive to move in that dimension since the packet is not already at the destination coordinate. At each hop (i.e., node), the router picks the productive dimension with the shortest output queue to advance the packet.

Figure 12:
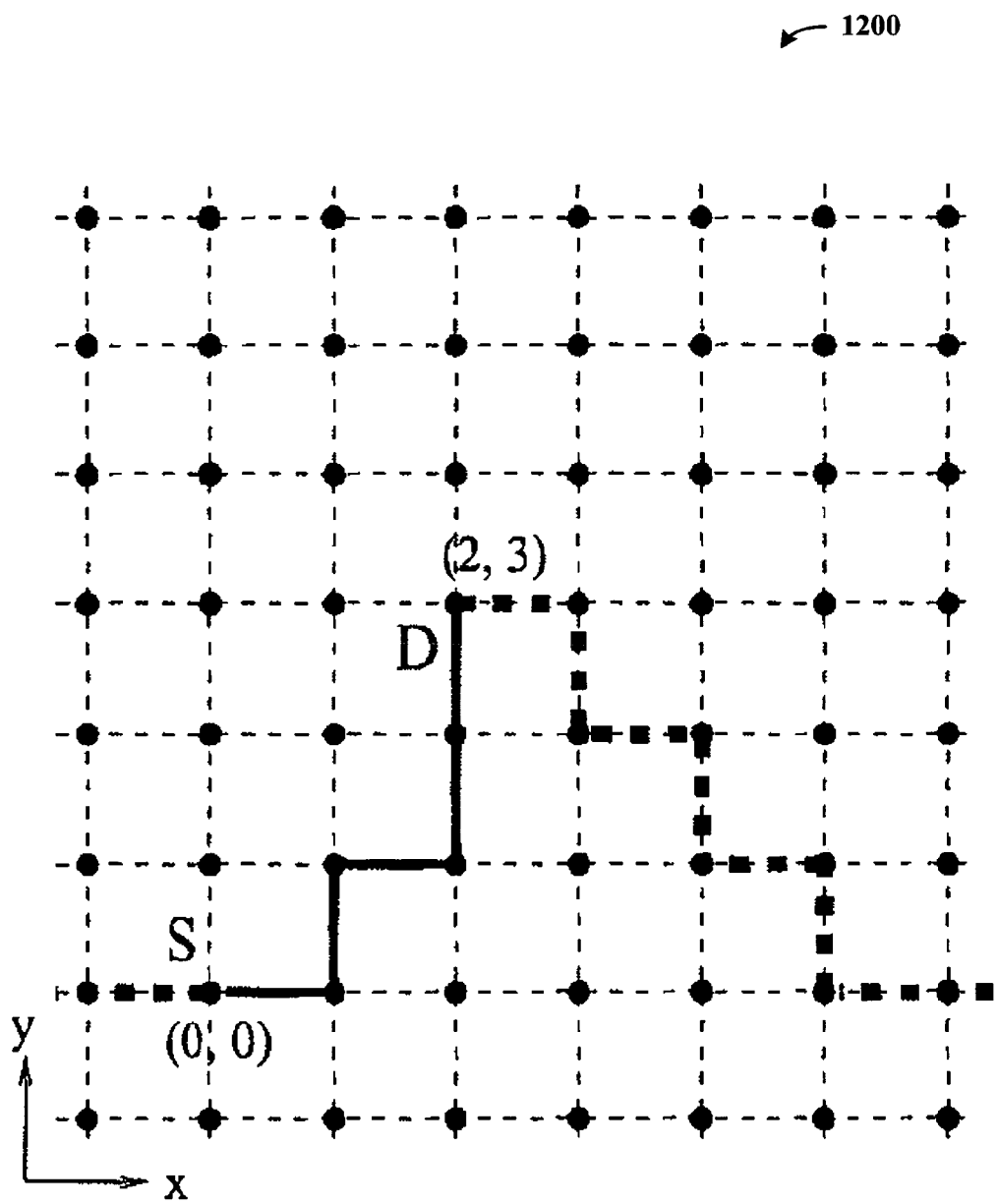
FIG. 12 shows a packet routing approach using multi-dimensional channel queue routing, according to another example embodiment of the present invention.

Expanding upon the above example where a packet is routed from s=(0, 0) to d=(2, 3) in an 8-ary 2-cube network, when congestion is small enough such that it is less than a threshold above the average quadrant congestion, the packet is routed completely within quadrant I (+1, +1). FIG. 12 shows such an example route of the packet in bold. On the first hop, the productive dimension vector is p=(1, 1); that is, both the x and y dimensions are productive. Suppose the channel queue in the x dimension is shorter so the packet proceeds to node (1, 0). At (1, 0) p is still (1, 1) so the packet can still be routed in either x or p. At this point, suppose the queue in the y dimension is shorter, so the packet advances to node (1, 1). At (1, 1), p is still (1, 1) and this time the route is in x to (2, 1). At this point, the packet has reached the destination coordinate in x, so p=(0, 1). Since the only productive dimension is y, the remaining hops are made in the y dimension regardless of queue length. A second example route is shown in dashed as an example of routing in quadrant II (−1, +1).

In connection with the above discussion of channel queue routing approaches, deadlock is addressed by implementing 3 virtual channels (VCs) per unidirectional physical channel, in connection with another example embodiment. This approach may involve, for example as an extension thereof, the scheme proposed in the *-channels algorithm for wormhole flow control developed for the non-minimal GOAL algorithm as described in L. Gravano, G. Pifarre, P. Berman, and J. Sanz, *Adaptive deadlock- and livelock-free routing with all minimal paths in torus networks*, IEEE Transactions on Parallel and Distributed Systems, 5(12):1233-1252, December 1994, which is fully incorporated herein by reference.

For general information regarding data routing, and for specific information regarding approaches that may be implemented in connection with one or more example embodiments of the present invention, and in particular with the channel queue routing approaches discussed above, reference may be made to A. Singh, W. J. Dally, A. K. Gupta, and B. Towles, *Adaptive channel queue routing on k-ary n-cubes*, in Proc. of the Symposium on Parallel Algorithms and Architectures, pages 11-19, June 2004, which is fully incorporated herein by reference.

While the present invention has been described with reference to several particular example embodiments, those skilled in the art will recognize that many changes may be made thereto without departing from the spirit and scope of the present invention. For example, various aspects of the routing approaches described herein may be selectively applied to asymmetric networks such as meshes.

What is claimed is:

1. A network routing arrangement having a plurality of nodes adapted for routing data, the arrangement comprising:
   a plurality of channels via which data traffic is routed between the nodes, each channel having a channel queue for holding data queuing for routing;
   a congestion monitor configured and arranged to estimate a global traffic congestion condition as a function of congestion in the channel queues by identifying the global traffic congestion condition as benign in response to the mathematical product of the shortest output queue length among channels between the source and destination and the hop count in the path from the source to the destination, being less than or equal to, the product of the shortest output queue length between the source and an intermediate node and the hop count for the path from the source to the intermediate node to the destination; and
   a data routing controller configured and arranged, for each packet of data, to direct the routing of the data packet between a source and a destination by,
      in response to the congestion monitor estimating a global traffic congestion condition predefined as benign, providing a routing configuration that facilitates routing of the data traffic along a shortest path between the source and destination, and
      in response to the congestion monitor estimating a global traffic congestion condition predefined as adversarial, providing a routing configuration that facilitates routing of the data traffic via a path between the source and destination that is different from and longer than said shortest path.

2. The arrangement of claim 1, wherein the congestion monitor is configured and arranged to estimate a global traffic congestion condition by
   identifying the global traffic congestion condition as adversarial in response to the global traffic congestion condition not being identified as benign.

3. A network routing arrangement having a plurality of nodes adapted for routing data, the arrangement comprising:
   a plurality of channels via which data traffic is routed between the nodes, each channel having a channel queue for holding data queuing for routing;
   a congestion monitor configured and arranged to estimate a global traffic congestion condition as a function of congestion in the channel queues by identifying the global traffic congestion condition as adversarial in response to the mathematical product of the shortest output queue length among channels between the source and destination and the hop count for the path from the source to the destination, being greater than, the product of the shortest output queue length between the source and an intermediate node and the hop count for the path from the source to the intermediate node to the destination; and
   a data routing controller configured and arranged, for each packet of data, to direct the routing of the data packet between a source and a destination by,
      in response to the congestion monitor estimating a global traffic congestion condition predefined as benign, providing a routing configuration that facilitates routing of the data traffic along a shortest path between the source and destination, and
      in response to the congestion monitor estimating a global traffic congestion condition predefined as adversarial, providing a routing configuration that facilitates routing of the data traffic via a path between the source and destination that is different from and longer than said shortest path.

4. The arrangement of claim 3, wherein the congestion monitor is configured and arranged to estimate a global traffic congestion condition by
   identifying the global traffic congestion condition as benign in response to the global traffic congestion condition not being identified as adversarial.

5. A network routing arrangement having a plurality of nodes adapted for routing data, the arrangement comprising:
   a plurality of channels via which data traffic is routed between the nodes, each channel having a channel queue for holding data queuing for routing;
   a congestion monitor configured and arranged to estimate a global traffic congestion condition as a function of congestion in the channel queues; and
   a data routing controller configured and arranged, for each packet of data, to direct the routing of the data packet between a source and a destination by,
      in response to the congestion monitor estimating a global traffic congestion condition predefined as benign, providing a routing configuration that facilitates routing of the data traffic along a shortest path between the source and destination, and
      in response to the congestion monitor estimating a global traffic congestion condition predefined as adversarial, providing a routing configuration that facilitates routing of the data traffic via a path between the source and destination that is different from and longer than said shortest path; and
   wherein the network routing arrangement includes a tornado topography and wherein the congestion monitor uses network backpressure to transfer congestion information.

* * * * *

UNITED STATES PATENT AND TRADEMARK OFFICE
CERTIFICATE OF CORRECTION

PATENT NO.       : 7,633,940 B1                                     Page 1 of 1
APPLICATION NO.  : 11/167906
DATED            : December 15, 2009
INVENTOR(S)      : Singh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1033 days.

Signed and Sealed this

Ninth Day of November, 2010

David J. Kappos
*Director of the United States Patent and Trademark Office*